Patented July 16, 1929.

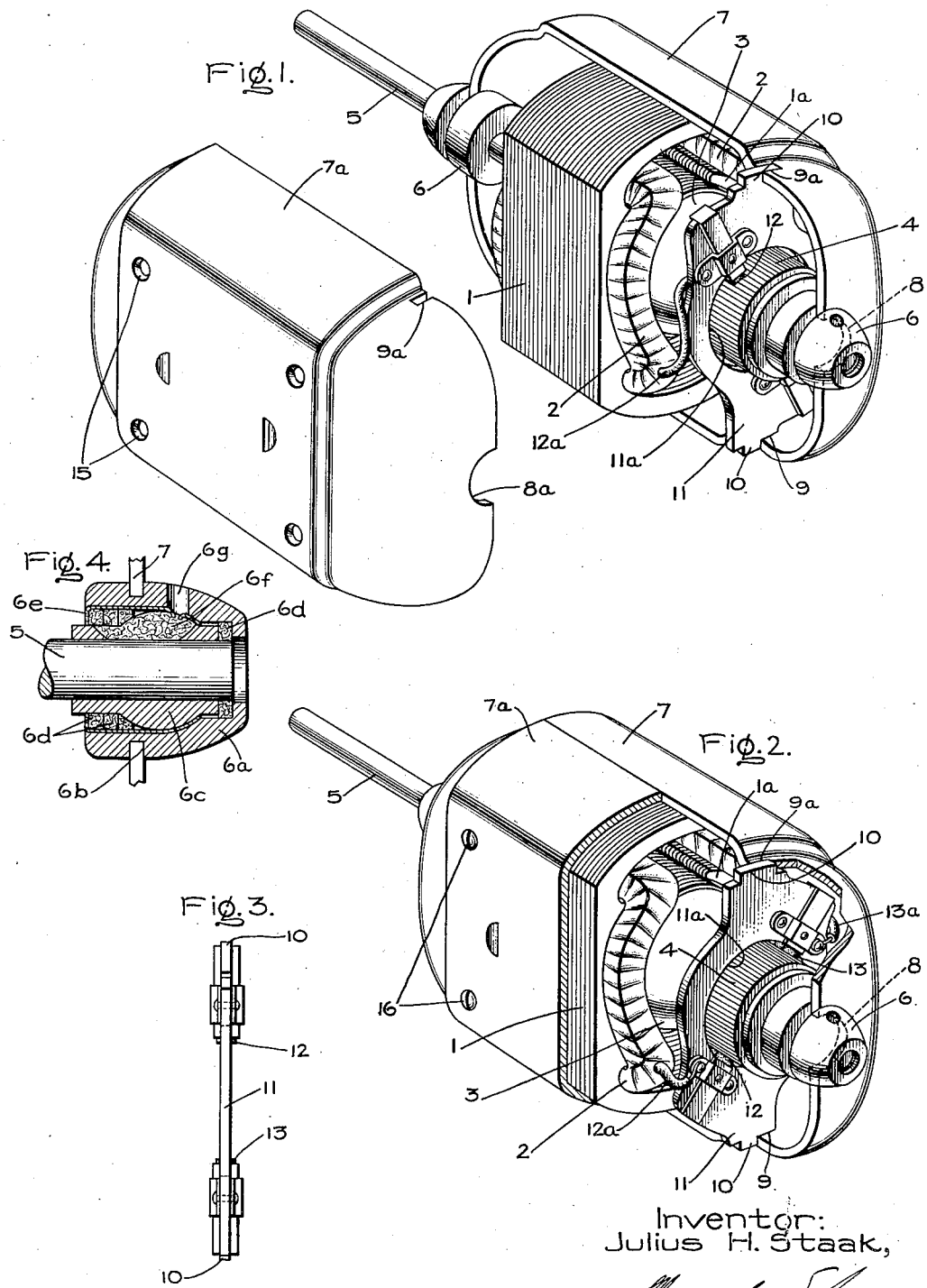

1,721,419

UNITED STATES PATENT OFFICE.

JULIUS H. STAAK, OF FORT WAYNE, INDIANA, ASSIGNOR TO GENERAL ELECTRIC COMPANY, A CORPORATION OF NEW YORK.

DYNAMO-ELECTRIC MACHINE.

Application filed January 6, 1927. Serial No. 159,442.

This invention relates to dynamo-electric machines and has for its object the provision of a structure by which the manufacturing and assembling operations in the construction thereof are reduced to a minimum. A further object of the invention is to construct a brush holder, to be used in machines of this character in which commutators are employed, by means of which the direction of rotation for which the machine was originally constructed may be easily reversed.

The invention will be more readily understood from the following description taken in connection with the accompanying drawing, in which Fig. 1 is a perspective view of my improved dynamo-electric machine with a part of the casing moved slightly to one side to more clearly show the relation of parts; Fig. 2 is another perspective view of the assembled machine wherein part of the casing is broken away to show the brush holder and the associated parts in a position for reverse operation relative to that shown in Fig. 1; Fig. 3 is a side elevation of the brush holder; and Fig. 4 is a sectional view of the armature shaft bearing showing the shaft and a portion of the casing in elevation.

The embodiment of the invention illustrated in the drawing comprises a laminated stator 1 with projecting poles $1^a$ having field windings 2 thereon, a rotor 3 carrying an armature winding, a commutator 4 for the armature winding, a rotor supporting shaft 5, and bearings 6 supported in recesses 8 and $8^a$ in the casing portions 7 and $7^a$ respectively for retaining the rotor in operative relation to the stator. The casing of the machine is formed in two portions each conforming in shape with the stator, so that when they are secured together the stator will be clamped in place. In order to eliminate the necessity of forming the casing portions 7 and $7^a$ very accurately, as required to align the bearings 6 with the rotor shaft 5 when ordinary sleeve bearings are used, self aligning bearings are employed. These bearings are made in two parts, a shell $6^a$ with a circumferential groove $6^b$ for retaining it between the casing portions 7 and $7^a$, and a bearing member $6^c$ rounded to permit longitudinal tilting thereof in the shell. When the motor is assembled, if the shell $6^a$ is not in exact alignment with the shaft as retained by the casing, the bearing member $6^b$ will assume a position on the shaft in alignment therewith and the clamping of the casing portions together will not transmit bending stresses from the shaft to the casing, this prevents the bearings binding the shaft. A wick $6^f$ in the bearing member $6^c$ retains oil for the bearing which may be supplied through an oil hole $6^g$, and felt washers $6^d$, retained by sleeve $6^e$ and the shell, prevent oil leaking out of the bearing member. The portions of the casing are formed with abutting edges having recesses 8 and $8^a$ for supporting the bearings 6, recesses or notches 9 and $9^a$ for receiving projections 10 of a brush holder plate 11 or other suitable supporting member, and openings 15 for screws 16 to secure the casing together. Although the plate 11 may be of any suitable form in this particular instance it is provided with an opening $11^a$, through which a commutator 4 projects, and supports brushes 12 and 13 insulated from the casing portions 7 and $7^a$ in any suitable manner, for example by forming the plate 11 of insulating material. The brushes 12 and 13 are provided with conductors $12^a$ and $13^a$ connecting them to a suitable external circuit and are supported on the plate at an acute angle to the axes of the projections 10 so that when the plate 11 is reversed, by reversing the position of the projections, the brushes will be shifted in angular position relative to the stator.

Fig. 2 of the drawing shows the plate 11 reversed relative to the position shown in Fig. 1 and clearly indicates how the brushes are shifted in angular position by the reversal of the plate.

In assembling the foregoing described structure the windings 2 are secured on the stator poles $1^a$, rotor 3 is placed in the stator, the desired connection is made between the brushes and the field windings, brush holder plate 11 with its brushes is put on the commutator 4, and bearings 6 are placed on the shaft 5. The above enumerated parts are placed in the casing portion 7 in such position that the bearings 6 are in recesses 8 and projections 10 are in recesses 9, casing portion $7^a$ is then secured by screws 16 passing through openings 15 to abutting casing portion 7, and the elements of the construction are thereby supported in operative relation to each other, the casing clamping the stator in place. The use of the two part bearing 6 prevents any possibility of the casing portions binding the bearings on the shaft 5 and the parts of the casing, therefore, can be much more cheaply made than heretofore because it is not necessary that they support the bearings in exact alignment with the shaft.

In operation the machine may be connected to a source of potential so that current will flow through the armature and field windings for driving it as a motor or it may be driven by any suitable means and used for a generator to supply current to an external circuit, as will be readily understood by those skilled in the art from the foregoing described construction.

The construction as shown in Fig. 1 is of an arrangement of parts for rotation of the armature clockwise as viewed from the right hand end of the shaft 5. It frequently becomes necessary to employ a dynamo-electric machine of this type, either as a motor or generator, for operation counter-clockwise as viewed from the right end of shaft 5, and it is usual to change the direction of current flow in the field winding and adjust the position of each brush angularly clockwise to give satisfactory operation. This mode of providing for reverse operation necessitates using an angularly adjustable slidable brush holder which is eliminated by reason of a rearrangement of parts made possible by my construction. When it is desired to employ the dynamo-electric machine shown in Fig. 1 for reverse rotation, counterclockwise as viewed from the right of shaft 5, the casing portion 7ª is removed as shown, and the stator, rotor bearings, and brush holder plate are removed far enough to permit the removal of plate 11 from the shaft 5. The plate 11 is removed from the shaft without disconnecting the brush conductors 12ª and 13ª and rotated about an axis across the face thereof perpendicular to a line drawn through the projections 10 a half revolution, or until the upper projection occupies the lowermost position and can be placed in the lower recess, it is then put on the commutator, portions 10 are seated in the recesses 9, the structure is assembled as previously described and results in the arrangement of parts shown in Fig. 2. This rearrangement of parts performs two functions, first it reverses the direction of current flow through the armature winding, without changing the direction of flow of current through the field, and second it changes the angular position of the brushes relative to the field windings so as to give satisfactory commutation and operation in a counterclockwise direction as viewed from the right of shaft 5 in Fig. 1, as will be clear from a comparison of Fig. 1, showing the parts in one position, and Fig. 2, showing them in the above described position.

When the dynamo-electric machine is employed as a motor the reversal of the brush holder plate will cause it to rotate in an opposite direction, and when used as a generator it will permit operation thereof in a reverse direction maintaining the same polarity of the brushes or operation in the same direction with reverse polarity of the brushes, which will be readily understood by those skilled in the art.

It will be seen from the foregoing description that I have produced a dynamo-electric machine that may be easily constructed and assembled and in which a mere rearrangement of parts provides for satisfactory operation in either direction of rotation.

I desire to be understood that my invention is not limited to the particular arrangement shown and described, and I intend in the appended claims to cover all modifications which do not depart from the spirit and scope of my invention.

What I claim as new and desire to secure by Letters Patent of the United States, is:—

1. A dynamo-electric machine comprising a stator, a shaft, a rotor including a commutator mounted on the shaft, brushes for said commutator, a plate carrying said brushes, and a casing divided longitudinally into two parts for supporting said stator, each of said parts having recesses therein cooperating with recesses in the other part for supporting said brush carrying plate and said rotor in operative relation to the commutator and the stator respectively.

2. A dynamo-electric machine comprising a stator, a rotor including a shaft, bearings on said shaft made in two parts one part carried by the shaft and tiltable longitudinally relative to the other, and a casing divided longitudinally into two parts, means for securing the parts of said casing and said stator together so as to engage said other part of the bearings for supporting the rotor in operative relation to the stator without transmitting bending stresses from said casing to said shaft.

3. In a dynamo-electric machine the combination of an annular stator, a rotor including a commutator supported therein, a casing formed of two abutting parts each conforming to the shape of the stator to form a support therefor and extending longitudinally therebeyond to engage said rotor for supporting it in operative relation to the stator, brushes in contact with said commutator and a plate carrying said brushes having projections thereon, the cooperating parts of said casing engaging the projections on said plate and said rotor, and means securing the parts of said casing together, whereby the rotor and the commutator are supported in operative relation to the stator and the brushes respectively.

4. A dynamo-electric machine comprising a stator, a shaft, a rotor including a commutator for the rotor, brushes for said commutator, a plate carrying said brushes, a casing for supporting said stator formed in two cooperating parts having recesses therein for supporting said brush carrying plate and said rotor in operative relation to the commutator and the stator respectively, and means carried between said casing and said shaft for preventing bending stresses in the shaft being resisted by the casing.

5. In a dynamo-electric machine the combination of a stator, a rotor including a commutator supported therein, a casing formed of two abutting parts for supporting the stator, each part of said casing having a plurality of notches therein alined with notches in the other part to form openings, brushes in contact with said commutator and means carrying said brushes including projections extending into openings formed by two of said notches for supporting the brushes, said rotor extending into other openings formed by the other two of said notches and means for securing the parts of the casing together, whereby parts of the dynamo-electric machine are supported as a unitary structure.

6. In a dynamo-electric machine, the combination of a stator, a rotor having a shaft, a casing formed of two abutting parts for supporting the stator, each part of said casing having a plurality of notches therein alined with notches in the other part to form openings, and bearings on said shaft having circumferential grooves therein, two of the notched parts of said casing portions extending into said circumferential grooves when said casing engages said stator to aline said rotor with said stator.

7. In a dynamo-electric machine, the combination of a stator, a rotor having a shaft, brushes for said rotor and a brush carrying member therefor, a casing formed of two abutting parts for supporting the stator, each part of said casing having a plurality of notches therein alined with notches in the other part to form openings, and bearings on said shaft having circumferential grooves therein, two of the notched parts of said casing portions extending into said circumferential grooves and engaging said brush carrying member when said casing engages said stator to aline said rotor with said stator.

8. A dynamo-electric machine, including a rotatable armature having a winding and a commutator for said winding, brushes supported in one position bearing on said commutator for completing an electric circuit through said armature winding from an external circuit for its rotation in one direction, and means including a reversible brush carrying plate having supporting projections for simultaneously shifting the brushes to another angular position relative to said first mentioned position and reversing the connections of said armature to the external circuit for rotation thereof in the other direction.

9. An electric motor including a casing formed in two parts, each part having notches in the edges thereof cooperating with notches in the other part to form openings, a stator supported by the casing, a rotor extending through one of the openings at each end of the casing, said rotor and said stator being connected to the same external circuit by means including brushes for the rotor, and a plate for supporting said brushes having projections at an acute angle to the brushes extending through others of said openings, whereby a reversal of the plate will simultaneously reverse the current flow through the armature and change the position of the brushes causing a reversal of rotation of the rotor.

10. A dynamo-electric machine including a rotatable armature having a winding and a commutator for said winding, brushes supported in one position bearing on said commutator for completing an electric circuit through said armature winding from an external circuit for its rotation in one direction, and means including a reversible brush carrying member for reversing the connections of said armature to the external circuit for rotation thereof in the other direction.

11. In a dynamo-electric machine the combination of a stator, a rotor therein, bearings for said rotor comprising a shell and a sleeve therein, a casing divided longitudinally into two parts, each part conforming to said stator and extending beyond each end thereof, means for securing the two parts of said casing together so as to support said stator and both of said bearing shells between them for supporting said rotor.

12. A dynamo-electric machine comprising a stator, a rotor including a commutator, brushes for said commutator, a member for carrying said brushes, a casing divided longitudinally into two parts, each part conforming to said stator and extending beyond each end thereof, and means for securing the parts of said casing together so as to support said brush carrying member and said rotor in operative relation to the commutator and the stator respectively.

13. A dynamo-electric machine comprising a stator, a rotor having a shaft, a casing divided longitudinally into two parts, means for securing the parts of said casing and said stator together, and means carried between the parts of said casing surrounding said shaft and freely movable to align itself with the axis of said shaft so that the rotor is supported in the stator without transmitting bending stresses from said casing to said shaft.

14. A dynamo-electric machine including a rotatable armature having a winding and a commutator for said winding, brushes bearing on said commutator in position for rotation of said armature in one direction, a reversible member for supporting said brushes, means for supporting said member arranged nearer one of said brushes than the other so that upon reversal of said member on its support said brushes will bear on said commutator in a position for rotation of said armature in the other direction.

In witness whereof, I have hereunto set my hand this 3rd day of January, 1927.

JULIUS H. STAAK.